United States Patent [19]

Kay et al.

[11] 4,435,337

[45] Mar. 6, 1984

[54] PROCESS FOR EXTRACTING RUBBER AND BY-PRODUCTS FROM GUAYULE AND GUAYULE-LIKE SHRUBS

[75] Inventors: Edward L. Kay, Akron; Richard Gutierrez, Canal Fulton, both of Ohio

[73] Assignee: The Firestone Tire & Rubber Company, Akron, Ohio

[21] Appl. No.: 298,447

[22] Filed: Sep. 1, 1981

Related U.S. Application Data

[63] Continuation-in-part of Ser. No. 263,387, May 13, 1981, abandoned, and Ser. No. 149,862, May 14, 1980, abandoned.

[51] Int. Cl.$^3$ .............................................. C08C 4/00
[52] U.S. Cl. .................................. 528/493; 528/491; 528/494; 528/495; 528/496; 528/498; 528/933; 260/412.8; 528/930
[58] Field of Search ............... 260/814, 816 R, 816 G, 260/817, 818, 819, 821, 822

[56] References Cited

U.S. PATENT DOCUMENTS

| | | | |
|---|---|---|---|
| 741,258 | 10/1903 | Lawrence | 260/818 |
| 1,695,676 | 10/1928 | Yeandle | 260/816 |
| 1,753,184 | 4/1930 | Spence | 260/816 |
| 2,281,336 | 4/1942 | Stacom | 260/816 |
| 2,390,860 | 12/1945 | Williams | 260/818 |
| 2,459,369 | 1/1949 | Tint | 260/818 |
| 2,618,670 | 11/1952 | Clark | 260/818 |
| 2,665,317 | 1/1954 | Clark | 260/818 |

*Primary Examiner*—C. A. Henderson
*Attorney, Agent, or Firm*—Daniel N. Hall

[57] ABSTRACT

Rubber, hydrocarbons, i.e., resins, and other useful by-products are extracted, recovered and isolated from shrubs such as guayule and guayule-like shrubs by a procedure wherein the entire non-defoliated shrub, after being comminuted, is processed in an aqueous and/or a non-aqueous system. An optional water treatment step can be used to remove water solubles and/or facilitate processing and achieve increased yield of desired by-products.

7 Claims, No Drawings

PROCESS FOR EXTRACTING RUBBER AND BY-PRODUCTS FROM GUAYULE AND GUAYULE-LIKE SHRUBS

CROSS REFERENCE TO RELATED APPLICATIONS

This application is a continuation-in-part of copending applications U.S. Ser. No. 263,387, filed May 13, 1981, now abandoned and U.S. Ser. No. 149,862, filed May 14, 1980, now abandoned.

BACKGROUND OF THE INVENTION

1. Field of the Invention

This invention relates to processes for recovering useful products efficiently from plant materials by solvent and water extraction. More specifically, the invention relates to the processing of fibrous plant materials such as guayule shrub and guayule-like material to recover and isolate rubber, resins, water-solubles and bagasse as herein defined, and related materials by either water flotation or solvent extraction or a combination of both.

2. Description of the Prior Art

The usual natural rubber of commerce is obtained by tapping the Hevea rubber tree (Hevea brasiliensis), collecting its latex, and coagulating the latex to obtain rubber. Neither Hevea nor any other similar rubber producing tree can be practically grown in the United States. Future green plant production of rubber and hydrocarbons in the United States will probably involve guayule and guayule-like plants and require extraction, recovery and isolation processes more like those applicable to guayule (Parthenium argentatum) than those applicable to Hevea.

Guayule is one of many rubber producing plants. It has served as an important source of rubber in the past and interest in it has recently revived. The prehistoric native process for extracting rubber from guayule was to chew pieces of shrub, expectorate fibrous matter and retain gummy matter until a mass of resinous rubber accumulated in the mouth. Consolidation of many chewing-gum sized pieces provided enough material for rubber balls and other articles.

It is significant that the most modern process for extracting rubber from guayule is that, for example, practiced in a pilot plant at Saltillo, Coahuila, Mexico, and described in detail by the National Academy of Sciences 1977 booklet "Guayule: An Alternative Source of Natural Rubber."

This process involves mastication of ground guayule shrub, which is effected by wet-milling with a rotating disc (pulping) mill, to recover the resinous rubber in the form of "worms" which are separated from fibrous matter by flotation in water. Antecedent to wet-milling, lush guayule shrub is parboiled to coagulate the rubber latex and aid in removing leaves, then hammermilled to a size suitable for wet grinding in the pulping mill. Subsequent to the wet-milling and separation of bark and wood, the recovered rubber is deresinated by acetone extraction and purified by dissolving in cyclohexane and filtering or centrifuging. These main processing steps and several auxiliary operations make up the current complicated separation process for winning rubber from guayule shrub. For the sake of clarity in presenting data, the preceding described process will be referred to as the "Saltillo" process.

The Saltillo process is essentially the same as that described in U.S. Pat. No. 2,434,412. It is also similar to the process taught in U.S. Pat. No. 2,459,369 except that deresination of the rubber results in a lower recovery of resin than in the patented process of deresinating the whole plant material; this patent does, however, indicate that it would be optional to process defoliated shrub. This statement should be considered in the light of the statement in U.S. Pat. No. 4,159,903 (col. 4, lines 25–27) that the entire plant, except the leaves, must be processed to extract the rubber.

3. General Background

Processing of whole guayule shrub has definite economic and energy-conservation benefits. For example, the processing costs and energy requirements for parboiling and defoliating of guayule shrub are eliminated.

Additional benefits of applicants' invention will be more apparent if one realizes that guayule shrub contains not only a valuable rubber component but also a sugar fraction generally described as containing sugars and polysacchrides as well as a resin fraction containing terpenes and glyceride-esters. Again, for the sake of clarity, the sugar and polysaccharide fraction will be referred to as the water-soluble fraction to distinguish it from the resin fraction which will be defined based on solubility characteristics; therefore, the resin fraction is defined as that portion of guayule shrub which is soluble in a deresinating solvent such as acetone or other solvent herein disclosed as being equivalent to acetone.

A really efficient guayule processing procedure should recover all of the inherently valuable components of guayule shrub. Applicants will endeavor to specifically disclose the advantages of their invention over the prior art relative to recovery of all of the valuable components of guayule shrub in an economical and energy-efficient manner.

In general, to the Saltillo process will be referred to as the most technologically advanced process of the prior art. The procedure of recovering and isolating guayule rubber by dispersing ground guayule shrub in water and allowing the rubber to float to the surface for subsequent recovery will be referred to as the water-flotation procedure.

The process of extracting rubber directly from the guayule shrub with a hydrocarbon will broadly be referred to as solvent extraction. Solvent extraction of rubber can be effected by either percolation or total immersion. By "percolation" it is meant that solvent is passed through a fixed bed of shrub to effect extraction. By "immersion" it is meant that the shrub is immersed in solvent contained in a suitable vessel and the shrub/solvent mixture can be agitated to effect extraction.

By "whole" guayule shrub it is meant the complete shrub including the roots, base, stem, branches and leaves. It is also intended to also include "pollarded" guayule shrub in the above definition of "whole" guayule shrub.

"Pollarded" guayule shrub is defined as shrub which is harvested by cutting the shrub a few cm above ground level and harvesting the greater portion of the base, branches, stems and leaves. The root system is left in the soil to generate another "shrub". By defoliated guayule shrub is meant the whole guayule shrub (including pollarded shrub) which has been treated to remove essentially all of the leaves.

Other abbreviations used in this specification refer to scientifically accepted notations.

For reasons of convenience and economy, it has been necessary to demonstrate the inventive processes using wild guayule shrub native to Texas. It is believed that the disclosed processes would give essentially the same results with cultivated guayule and guayule-like shrubs of all varieties and of generally higher rubber content.

Those skilled in the art have long recognized that direct solvent extraction of rubber from guayule shrub seems to offer many advantages over water flotation. The primary advantage would be elimination of many processing steps including parboiling and/or pressure cooking; wet-milling; addition of acid, alkali, surfactants, etc.; flotation; water washing; and several drying and purification steps. Subsidiary advantages to be expected from solvent extraction in comparison to water flotation are large savings in process water (guayule grows and is processed in arid regions), possible improved resin yields and lower heavy-metal contamination of the rubber and the provisions for solution-phase purification as an integral component of the operation. However, solvent extraction of rubber from guayule, though often studied, has been found completely impractical on a commercial scale, heretofore. In fact, the earliest industrial techniques for guayule processing were based on solvent extraction but were found impractically difficult and expensive and were replaced by wet-milling techniques, see U.S. Pat. No. 982,373. Solvent extraction is contemplated in U.S. Pat. No. 1,695,676 wherein the cell walls of the guayule shrub are first broken down by penetrating the plant material with high pressure gas and suddenly releasing it to effect an instantaneous expansion. The advantages of this process are diminished by the expense of the requisite high pressure equipment and the inherent inefficiency of a batch-type procedure.

As is well known, a fundamental problem in solvent extraction of rubber from plant materials is that rubber is a high molecular weight polymer which passes through cell walls and membranous tissue with difficulty even when in solution. Thus, to accomplish solvent extraction of rubber, the plant structure has to be very thoroughly disrupted.

U.S. Pat. No. 4,136,131 is directed to the extraction of rubber or rubber-like materials from fibrous plants, such as guayule, wherein said plants are subjected to simultaneous compression and high shear forces under nonaqueous conditions to result in (1) comminuted fibrous matter and (2) rubber-like substances which cohere into a plastic mass; this mass is shaped into particles; said rubber-like substances are then solvent extracted from the particles and then recovered from the solvent.

Additional prior art patents of a general background nature include U.S. Pat. Nos. 1,753,185; 2,744,125; 2,666,317; 2,618,670; 2,572,046 and 2,549,763.

A recent U.S. Pat. No. 4,159,903, is directed to the improved production of high molecular weight polyisoprene rubber by administering to plants, such as guayule, an amine-type growth regulator. In column 4, lines 25-27 it is stated that the natural rubber latex in guayule is found in all parts of the plant but the leaves; it is then stated that the entire plant, except the leaves, must be processed to extract the rubber.

BRIEF DESCRIPTION OF THE INVENTION

According to the present invention, there is provided a process:
1. for isolating rubber, resins, water-solubles, and bagasse from comminuted guayule and guayule-like fibrous plant material which comprises the steps of:
(a) drying the plant material to a moisture content of about 5 to about 25% by weight; and then
(b) deresinating with essentially anhydrous oxygenated organic solvent; and
(c) recovering rubber, water-solubles and by-product bagasse by water flotation.

Preferably, in this process the essentially anhydrous oxygenated solvent contains less than about 1% water and is an alcohol, ether, ester or ketone having three to eight carbon atoms such as octanol (all isomers), diethyl or di (n-propyl) ether, ethyl acetate, n-propyl propionate, methyl ethyl ketone, 2-heptanone and the like. Typically it is acetone containing less than about 1% water or resin miscella as described hereinbelow.

Also preferably in the inventive process the deresinating step (b) is carried out before the flotation step (c), step (c) is carried out with water at a temperature of at least about 60° C. and entire (whole) non-defoliated fibrous plant (shrub) is processed. Defoliated shrub can also be processed, alone or in combination with non-defoliated shrub.

The inventive process, as we have discovered, demonstrated in our representative examples, provides significant process improvements for achieving high yields of acceptable rubber and by-products such as the water-soluble and resin fractions and bagasse from guayule and guayule-like shrubs. Processing costs and energy requirements are significantly reduced and the rubber recovered is in commercially acceptable form. Other advantages and improvements will be apparent to those skilled in the art.

DETAILED DESCRIPTION OF THE INVENTION

In the practice of our invention in its broadest concept, the whole entire non-defoliated guayule shrub, including leaves can be conventionally ground, i.e., comminuted, for example, hammermilled, and the ground, comminuted material extracted with, optionally water then, acetone; or, acetone and optionally then water, to recover essentially all of the resins. The rubber can be recovered by water-flotation or by solvent extraction. The bagasse can be recovered saturated with water from the water-flotation procedure, a physical state which will facilitate partial hydrolysis of the bagasse to give a product suitable for feeding animals. Alternatively, essentially complete hydrolysis of the bagasse can be effected to fermentable sugars which could be used as such or fermented to prepare ethanol.

The bagasse recovered from the solvent extraction process would be relatively free of water and could be used to advantage as a fuel to supply the power requirements of our process. One practical result of processing the whole shrub is that if a solvent-percolation-bed is used, the bed is diluted with leaves and the process is more efficient in that the rubber/shrub ratio is lowered which tends to increase percolation of rubber miscella through the bed.

The inventive process for guayule and guayule-like shrub includes processing of the whole, entire shrub and recovering the rubbery component of said shrub via a water-flotation procedure. The whole shrub is ground, i.e., comminuted, in a hammermill followed by extraction with acetone and then, optionally, with water; the resins are removed by extracting the ground shrub with acetone; optional water extraction then, in addition to removing water-solubles, saturates the leaves which will then sink to the bottom in the water-flotation step. If fresh ground (comminuted) entire, whole shrub is charged to the water-flotation step, prior to acetone extraction, the leaves will tend to float to make recovery of rubber more difficult.

The non-defoliated Guayule shrub can also be processed in a non-aqueous system wherein acetone-extraction of Guayule shrub is followed by volatization of adsorbed acetone and hexane rubber extraction; a stable rubber product is recovered if an effective stabilizer such as an amine-type stabilizer is used in conjunction with our hexane extraction step. Non-defoliated, comminuted guayule and guayule-like plant material can also be processed by water flotation.

A preferred solvent-extraction procedure for recovering rubber from Guayule shrub involves counter-gravity extraction step.

Solvent extraction of rubber from guayule shrub by known methods of extraction has been found to be difficult. Extraction of the rubber can be done by percolation and total immersion. In percolation the viscosity of the rubber cement causes a slow percolation rate and extracting with a concentrated miscella becomes almost impossible. Lowering of the L/D (length/diameter) ratio of the column will aid percolation. In immersion, the rubber is extracted easily but filtering becomes a problem.

By employing a counter gravity method of extraction one can modify commercially available extraction equipment to extract the rubber.

In the practice of the invention it has been often found more efficient to deresinate the guayule shrub with concentrated resin miscella as herein defined.

A practical embodiment that can be implemented in the general procedure is to reduce dirt contamination in guayule rubber obtained by solvent-extraction via percolation by recycling to the column until the desired low levels of dirt are attained. The bed functions as an efficient filter.

In the extraction process for guayule shrub, several valuable by-products are recoverable and isolated. The bagasse, which is approximately 50% of the shrub, can be recovered and can be used as fuel to supply power for the process.

The resins which are extracted from the shrub are also recoverable and isolated. These are mixtures of terpenes, terpenoids, parthenoids and glycerides of fatty acids. The resin component also contains a valuable hard wax similar to carnuba wax. The resin can be considered for use as an adhesive in plywood and as a component in varnishes; said resin can also be used as a tackifying resin in the manufacture of reinforced composite rubber articles such as tires and car radiator hose.

The term "rubber" is defined herein in its normal sense as the elastic naturally occurring hydrocarbon polymer of isoprene having predominantly a cis-1,4 structure, such as that obtained from Hevea brasiliensis. "Rubber-like polymeric hydrocarbons" is used herein to refer to naturally occurring nonrubber hydrocarbon polymers such as gutta-percha and balata. These are also polymers of isoprene. "Polymeric hydrocarbon substances" is used herein generically to refer to both rubber- and rubber-like polymeric hydrocarbons.

The invention can be practiced with a large number of plant species bearing rubber and rubber-like polymeric hydrocarbons including particularly guayule (Parthenium argentatum), Rabbit-Brush (Crysothamnus nauseousus), Rubbervine (Cryptostegia grandiflora), Milkweeds (Asclepias incarnata, sublata, syriaca, et al), Goldenrods (Solidago altissima, graminifolia, leavenworthii, rigida, et al), Sow thistles (Sonchus arvensis oleraceous, et al), Rosin Weeds (Silphium species), Mountain Mints (Pycnanthemum species), and Cacalia atriplicifolia. Many other plants which produce rubber and rubber-like polymeric hydrocarbons are known, particularly among the compositae, Euphorbiaceae, Labiatae, and Moraceae and it is possible that the invention will be found applicable to most of these species also, particularly if plant breeders succeed in current efforts to develop for some of these species new varieties high in hydrocarbon and rubber contents.

The solvent extraction can be conducted in either a single- or a multiple-step operation. It is generally preferred to extract the ground, i.e., comminuted shrub fibrous plant material with a first solvent which will selectively remove resinous components, and then extract the deresinated shrub with a second solvent for removing the rubber or rubber-like polymeric hydrocarbons. Acetone as the first solvent and commercial hexane as the second solvent is the preferred combination, though it is understood that other solvent combinations would be readily apparent to a person of ordinary skill in the art. Alternatively, the resin and polymeric hydrocarbon substances can be removed by a single extraction with a solvent for both resin and rubber, such as hexane. In either case, the desired components can then be recovered from the solvent by conventional means.

Grinding (comminuting) of guayule shrub can be achieved with any one of the known mill units; these include hammer mills, roll mills, stone mills, ball mills and pulp mills. Preferably a hammer mill with an air conveyor system is used.

In the present inventive process the resins and the rubber we recovered in commercially acceptable high yields with solvent extraction and by water-flotation preceded by extraction. We also recover more bagasse when processing the whole shrub and achieve a reduction in processing energy requirements. It is usually preferred to process guayule shrub shortly after harvest, particularly if special storage techniques are not used.

It is understood that about 2% to 15% by weight of the leaves of guayule shrub represents a recoverable resin fraction depending on moisture content and season of harvest. We have found that it is often more efficient to deresinate with concentrated resin miscella as herein exemplified.

Usually in the process of this invention the fibrous plant material to be processed is dried to a moisture content of about 5 to about 25%. This moisture content is based on the part of the plant to be processed. For example, if the entire, non-defoliated plant is to be processed, it is based on the entire non-defoliated plant. If defoliated plant is to be used, the moisture content is based on defoliated plant. Pollarded plant can be defoliated or, preferably, non-defoliated and the moisture content is based accordingly. Drying can be accomplished by any convenient, economical technique or combination of techniques, such as air drying, oven drying, storage, and the like. Often the plant as harvested has a moisture content in the desired range and the drying is thus accomplished in vivo before harvesting. Drying can thus be accomplished before harvesting, after harvesting before collecting, after collecting before comminuting, after comminuting before storage (if storage is employed), or at any combination of the above. All that is desired is that the plant material before further processing have a moisture content within the specified range.

In a typical embodiment, the invention provides a process for isolating rubber, resins, water-solubles and bagasse from entire, non-defoliated, comminuted guayule and guayule-like fibrous plant material which comprises the steps of (a) drying the plant material to a moisture content of about 5 to about 25% by weight; and then (b) deresinating the dried material with acetone containing less than about 1% by weight water; and (c) recovering the rubber, water-solubles and by-product bagasse by water flotation, step (b) being carried out before step (c).

EXAMPLES

The following examples are representative of the invention or comparisons to it. In them, as elsewhere in the specification and appended claims, all parts and percentages are by weight unless otherwise specified. These examples can be varied within the context of the prior art and the total specification disclosure; they serve to illustrate, not to limit, the claimed invention. Optimization can be realized by one skilled in the art with a minimum of routine experimentation; comparative Example 13 is a flow sheet of the known Saltillo process.

Wild guayule shrub harvested in Fort Stockton, Texas, area was usually air-dried to a moisture content of 5–25% prior to grinding in a Wiley mill or hammer mill.

The percolation extractor used in the majority of the herein disclosed work consisted of a 10 cm diameter 152 cm high glass column which was usually charged with 3 kg of ground shrub. The shrub was supported by a steel plate having twenty-two 0.95 cm diameter holes to allow for miscella flow. A wire screen placed on the steel plate prevented passage of the ground shrub.

Usually 7 kg of solvent or miscella were charged to a 25 l reservoir. The solvent was pumped thru a rotameter and then thru a steam-heated water bath to control temperature. The solvent could be either recycled to the reservoir or charged to the column for percolation. A throttle valve was used to control flow rate. A sample port was provided for checking the flow rates as well as sampling the percolating resin miscella. Percolations were usually conducted at flooding conditions.

A Waring blender or a Bauer single disc mill was used to grind deresinated shrub to a fineness suitable for recovering rubber by water flotation.

Total immersion extractions were performed via immersing ground guayule shrub in the specified solvent contained in a suitable vessel and agitating with a suitable stirrer.

To demonstrate that the guayule rubber recovered by the disclosed processes was commercially acceptable, the recovered guayule rubber was compounded in a standard test recipe which was:

| Standard Test Recipe Modified ASTM-1A Recipe | |
|---|---|
| Ingredient | Parts |
| Rubber | 100 |
| Stearic Acid | 2.0 |
| Zinc Oxide | 6.0 |
| Sulfur | 3.5 |
| MBT* | 1.0 |

*MBT is 2-mercaptobenzothiazole

The procedure to prove the quality of the experimental guayule rubber samples was to test the compounded stock in a Monsanto Rheometer and subsequently actually vulcanize the compounded stock and obtain stress/strain data on the experimental vulcanizates.

A Monsanto Rheometer is used in these literally standard tests, with specific conditions employed being: operation at 100 rpm; use of the mini-die attachment in the apparatus, and the effecting of a one degree arc at 140° C. during the test procedure.

The reasons for the use of the rheometer test, as is well known, are plain and fundamentally sound. Rheometer data are based on torque measurements. The lowest torque value (ML) is an indication of the amount of energy just to mix the compound prior to the onset of vulcanization. The highest torque value (MH) is an indication of the state of cure after the vulcanization reaction has been effected. The torque values are expressed in "inch-pound" units and can be converted to "SI" units of Neuton-meters (N m) by multiplying the inch-pound values by 1.129848.

Additional valuable and informative rheometer data are "Ts" values which is the time to scorch; that is, the time measured in minutes to achieve a two-torque unit rise and the "Tc" which is the time in minutes required to achieve a 90 percent cure state.

A "Cure Rate Index" (CRI) is also generated from the rheometer data. The "CRI" is defined as:

$$\frac{1}{(Tc - Ts)} \times 100$$

and is indicative as to how fast the vulcanization reaction takes places; e.g., the rate of reaction.

All of the rheometer data are summarized in Table I which follows. For purposes of comparison and to demonstrate that the experimental guayule rubber obtained by the inventive processes have commercial value, rheometer data on commercial Hevea rubber (AMA-7) are also included in Table I.

Four Hevea-based samples were also compounded in the aforementioned test recipe. Test data on them have also been recorded in Table I to indicate the precision of the rheometer data.

As stated previously, the compounded samples of experimental guayule rubber were vulcanized to further define their commercial utility. The vulcanized sample specimens were then tested by standard and well known procedures to obtain values of: (1) 600% modulus; (2) tensile strength, and (3) percentage elongation. These "stress/strain" data are summarized in Table II. In accordance with the testing procedure, "stress/strain" data on commercial Hevea (AMA-7) are included in Table II for comparison purposes and to further demonstrate the potential commercial utility of the guayule rubber recovered by the inventive processes. Again, there are also recorded in Table II, which follows, a total of four sets of test data on the Hevea compound to indicate the precision of the stress/strain data.

The modulii and tensile values recorded in Table II are expressed in the English System of pounds-force/inch$^2$ (i.e., "psi"). The "psi" values can be easily converted to the "SI" units of megapascals (i.e., "MPa") by multiplication of any psi value by the numerical conversion factor 0.006894757. Generally, to accommodate involved practicalities of testing precision, the MPa values should be reported to the nearest tenth value.

EXAMPLE 1

Processing of Guayule Shrub Without Parboiling and Defoliation; Rubber Recovery via Water Flotation To demonstrate that guayule shrub can be processed without parboiling and defoliation, whole guayule shrub was ground in a hammermill to a nominal 3 mm size. A 2.27 Kg sample of the ground shrub was slurried with 20 Kgs. of water and the shrub/water slurry ground in a single disc pulping mill. The effluent from the pulping mill was diluted with water, agitated for about 15 minutes and then allowed to settle to allow the crude guayule rubber to float.

The crude guayule rubber was recovered by filtering the portion of water containing the crude rubber through cheese cloth. The crude rubber was pressed dry and then extracted with acetone to remove guayule resin. Care was taken to recover all of the bagasse and cork originally present in the crude rubber with the deresinated rubber so that a comparison could be made as to the amount of contamination of the crude rubber of this example with crude rubber obtained by variation of processing steps in the other examples.

The deresinated rubber along with the contaminant bagasse, cork and extraneous dirt were slurried in hexane to effect dissolution of the rubber and then filtered to remove hexane-insoluble material. Based on a material balance, the crude rubber contained 71% hexane-insoluble material.

Sufficient N,N'-bis(1-ethyl-3-methylpentyl)-p-phenylenediamine, as stabilizer, was added to the filtered hexane solution of guayule rubber to give 1.0 phr (parts per hundred rubber) of the phenylenediamine. Hexane was then allowed to evaporate from the solution to recover the purified guayule rubber. Purified guayule rubber obtained by this process contained an average of 6.5 ppm Cu, 3.5 ppm Mn and 128 ppm Fe.

For purposes of comparison, guayule rubber recovered by similar processing except the guayule shrub was defoliated prior to grinding and processing contained 3–4 ppm Cu, 1.5–2.0 ppm Mn and 87–113 ppm Fe; these results are essentially achieved in the practice of the Saltillo process. The abbreviation "ppm" herein stands for parts per million.

Comparison of the Cu, Mn and Fe contents of the rubber obtained by essentially the same processing from whole and defoliated guayule shrub demonstrates that the metal contamination of the rubber is only very slightly higher in the rubber recovered from the whole shrub. From a standpoint of commercial acceptability, the maximum level of Cu in Hevea rubber is usually specified at 10 ppm.

The yield of rubber was 83% and could be improved by avoiding mechanical losses associated with handling relatively small samples.

Guayle rubber recovered by this process, a Wiley mill being used to obtain a nominal 3 mm particle size, was identified as "GR-1" and mixed in the standard test recipe described previously. As indicated by the data recorded in Table I and II, the cure rate and state of cure as well as the stress/strain properties of the vulcanizate containing "GR-1" generally compared favorably with the Hevea control. The Ts value was slightly lower on the experimental guayule stock and the CRI was also higher relative to the Hevea stock. These values can be adjusted somewhat by adjustment of the compounding ingredients.

The results of Example 1 demonstrate that a commercially acceptable guayule rubber can be recovered by processing whole guayule shrub by the processing steps described. The advantage of the disclosed process over the prior art Saltillo process is that the steps of parboiling and defoliation are eliminated thus lowering processing costs and energy requirements. A further advantage is that the leaves are recovered with the bagasse and could be utilized as a fuel or upgraded by partial hydrolysis to an animal feed or upon complete hydrolysis to a fermentable sugar suitable for the production of ethanol.

EXAMPLE 2

Processing of Guayule Shrub Without Parboiling and Defoliation. The Whole Shrub is Deresinated to Recover Essentialy all of the Acetone-Soluble Resin Followed by Recovery of Guayule Rubbers via Water-Flotation.

To demonstrate this process, whole guayule shrub was ground in a hammermill without prior parboiling and defoliation. A 3.0 Kg sample of the ground shrub was deresinated via percolation with acetone in the percolation extractor procedure previously described. Recovery of guayule resin was essentially 100% in this experiment.

The deresinated shrub was stripped of acetone by slightly heating under vacuum and the dried shrub diluted with approximately 10 parts water per one part shrub prior to grinding in a single disc pulping mill. Although the shrub was stripped of acetone under vacuum, other means of removing acetone could be used; for example, displacing the acetone with water, steam stripping or heating with an inert gas purge or purging with superheated acetone. It should be stated that percolation of guayule shrub with acetone effectively coagulates the guayule latex in the shrub so that essentially the function of parboiling the shrub to coagulate the latex is duplicated by contact with acetone.

After grinding the deresinated shrub/water slurry in a single disc pulping mill, the ground material was treated in essentially the same manner as disclosed in Example 1.

The crude rubber contained 59% bagasse. Because of variability of natural products and the necessity to use wild shrub, we repeated the experiment an additional three times. The crude guayule rubber contained 54%, 44% and 50% bagasse respectively in these experiments.

These data indicate that not only does deresination of whole guayule shrub allow for essentially complete recovery of guayule resin, the acetone extraction surprisingly allows more of the bagasse and apparently the leaves to become water logged and sink with the bagasse thus allowing a cleaner crude rubber to be recovered.

Three batches of purified rubber recovered from this process contained an average of 5 ppm Cu, 1.7 ppm Mn and 59 ppm Fe which indicates that the disclosed process produces a commercially acceptable rubber.

One of the batches of guayule rubber was identified as "GR-2". In Tables I and II, the physical properties and vulcanization characteristics of the guayule rubber "GR-2" are shown. They compare favorably with the Hevea control.

Specifically, the rheometer data indicates that the GR-2 guayule stock has a slightly lower Ts and slightly higher CRI compared to the Hevea control. These values can usually be adjusted by optimizing the compounding. The Ts can usually be increased by using a prevulcanization inhibitor. The higher CRI is desirable since the value indicates that the vulcanization reaction is rather rapid and, therefore, commercial production of useful vulcanizates would be rapid lowering processing costs.

The stress/strain data of the GR-2 vulcanizate are essentially equivalent to the Hevea control.

TABLE I

| | Monsanto Rheometer Results | | | | |
|---|---|---|---|---|---|
| | | | Torque | | |
| | Ts | Tc | ML | MH | CRI |
| Test Recipe Containing: | | | | | |
| Hevea | 4.5 | 27.7 | 5.9 | 20.6 | 4.3 |
| " | 4.5 | 27.0 | 5.8 | 20.2 | 4.4 |
| " | 4.2 | 28.0 | 6.3 | 20.5 | 4.2 |
| " | 4.2 | 25.5 | 6.2 | 20.5 | 4.7 |
| Experimental Guayule Rubber: | | | | | |
| GR-1 | 2.3 | 8.1 | 2.8 | 15.6 | 17.2 |
| GR-2 | 2.2 | 18.8 | 4.0 | 23.3 | 6.0 |
| GR-3A | 2.7 | 20.5 | 4.2 | 18.8 | 5.6 |
| GR-3B | 2.2 | 18.3 | 4.7 | 22.0 | 6.2 |
| GR-4A | 4.5 | 25.0 | 3.5 | 18.0 | 4.9 |
| GR-4B | 5.8 | 28.5 | 3.5 | 16.7 | 4.4 |
| GR-6 | 2.6 | 19.4 | 4.5 | 21.4 | 6.0 |
| GR-9A | 3.9 | 26.5 | 2.0 | 20.2 | 4.4 |
| GR-9B | 2.6 | 16.7 | 2.4 | 21.6 | 7.1 |
| GR-10A | 2.5 | 17.0 | 2.9 | 20.3 | 6.9 |
| GR-10B | 2.2 | 19.0 | 3.5 | 22.5 | 6.0 |
| GR-10C | 2.7 | 16.6 | 1.0 | 18.4 | 7.2 |
| GR-10C-1 | 2.6 | 17.0 | 1.4 | 18.4 | 6.9 |

TABLE II

| | Stress/Strain Results Compounds Cured 20 Minutes At 140° C. | | | | |
|---|---|---|---|---|---|
| | 600% Modulus | | Tensile Strength | | Elongation |
| | psi | MPa | psi | MPa | % |
| Test Recipe Containing: | | | | | |
| Hevea | 1260 | 8.7 | 3020 | 20.8 | 725 |
| " | 1260 | 8.7 | 3050 | 21.0 | 725 |
| " | 1180 | 8.1 | 2930 | 20.2 | 750 |
| " | 1140 | 7.9 | 2840 | 19.6 | 725 |
| Experimental Guayule Rubber: | | | | | |
| GR-1 | 1340 | 9.2 | 3140 | 21.7 | 750 |
| GR-2 | 2130 | 14.7 | 2900 | 20.0 | 650 |
| GR-3A | 1390 | 9.6 | 3660 | 25.2 | 750 |
| GR-3B | 1520 | 10.5 | 3240 | 22.3 | 700 |
| GR-4A | 850 | 5.9 | 3110 | 21.4 | 800 |
| GR-4B | 640 | 4.4 | 2770 | 19.1 | 825 |
| GR-6 | 1540 | 10.6 | 3330 | 23.0 | 700 |
| GR-9A | 940 | 6.5 | 3160 | 21.8 | 750 |
| GR-9B | 1940 | 13.4 | 2960 | 20.4 | 650 |
| GR-10A | 1280 | 8.8 | 2650 | 18.3 | 700 |
| GR-10B | 1800 | 12.4 | 3170 | 21.9 | 700 |
| GR-10C | — | — | 1490 | 10.3 | 500 |
| GR-10C-1 | — | — | 1160 | 8.0 | 550 |

EXAMPLE 3

In this example, deresination is carried out with an anhydrous solvent to result in a low resin- content rubber from a low moisture content guayule shrub. We have discovered that, contrary to the prior teaching of using solvents containing water to deresinate guayule shrub, the use of essentially anhydrous solvents results in a low resin-content rubber. We have discovered that for a specified time of extraction, the presence of significant amounts of water in the deresinating solvent is detrimental to the obtaining of a low resin-content rubber.

Pioneering investigators Chubb, Taylor and Feutsel (*India Rubber World* 123 (5) 557, 1951) demonstrated that a water/acetone mixture efficiently deresinated guayule shrub. However, we have discovered that the use of essentially anhydrous deresinating solvents is more efficient in preparing a low resin-content guayule rubber.

To demonstrate the benefits of using essentially anhydrous solvents to deresinate guayule shrub, we deresinated guayule shrub ground in a Wiley mill to a nominal 3 mm size in the continuous extractor previously described. The extraction efficiency was monitored at specific time intervals and subsequently the rubber was recovered by water-flotation.

As shown by the data summarized in Table III, the use of solvents containing water actually gave greater than theoretical yields of resin as herein defined. It is concluded that the presence of large amounts of water in the extracting solvent effected some extraction of the water-soluble fraction leading to erroneously high extraction efficiencies for resin. This conclusion was substantiated by analyzing the resin content of the rubber recovered from the individual runs. It will be noted that the rubber recovered from the experiments using a mixed solvent/water always resulted in a higher resin-content rubber than when essentially anhydrous solvent was used. The prior art teaches that a low resin-content guayule rubber has superior utility compared to a high resin-content rubber indicative of the beneficial effects of the present invention. Although the invention is not limited by any theory, it is believed that the solubility parameters of mixed water/solvent systems are sufficiently different from those of acetone itself that the presence of large amounts of water actually decreases the solubility of some components of the resin in the extracting solvent.

The guayule rubber recovered from the shrub deresinated with essentially anhydrous acetone (i.e., less than 1% water) at 50° C. was identified as "GR-3A" and the rubber recovered from the essentially anhydrous isopropanol extracted shrub was identified as "GR-3B". Both "GR-3A" and "GR-3B" were mixed in the standard test recipe and evaluated in the Monsanto rheometer test. They were also vulcanized to obtain stress/strain data.

As shown in Tables I and II the experimental guayule samples compared favorably with the commercial Hevea control.

TABLE III
EFFECT OF WATER ON DERESINATION EFFICIENCY AND RESIN CONTENT OF RUBBER

| Solvent[1] | Extract Temp. °C. | % Resin Extracted After | | | | % Resin In Rubber |
|---|---|---|---|---|---|---|
| | | 15 min | 30 min | 45 min | 60 min | |
| Acetone | 25 | 71 | 71 | 75 | 75 | 1.2 |
| Acetone/H₂O | 25 | 94 | 97 | 100 | 103 | 4.9 |
| Acetone | 50 | 81 | 85 | 88 | 90 | 0.7 |
| Acetone/H₂O | 50 | 108 | 118 | 116 | 119 | 4.2 |
| Isopropanol | 50 | 78 | 86 | 89 | 93 | 2.1 |
| Isopropanol/H₂O | 50 | 95 | 104 | 109 | 114 | 3.6 |

[1]Solvent/H₂O; 88/12 parts

EXAMPLE 4
Deresination with Concentrated Resin Miscella

In this example deresinated guayule shrub, was deresinated by the procedure of Example 2, with concentrated resin miscella (see definition below). Extraction efficiency was increased and energy requirements for isolation of the resin were lowered.

It was determined that the use of concentrated resin miscella actually increases the rate of extraction of resin from guayule shrub and that it is possible and advantageous to use concentrated resin miscella to extract guayule resin.

This discovery is not predictable since theory teaches that, generally, the rate of extraction is faster with dilute solvents and slows as the concentration of the extract in solvent is increased.

As shown by the data summarized in Table IV, the rate of extraction is significantly increased if the resin concentration is of the order of 4% or higher. The ability to extract resin with miscella containing about 30% resin has very significant practical importance. The size of equipment to recover the resin from the miscella will be relatively smal and the energy requirement to remove the solvent from the resin according significantly lower.

Samples of guayule rubber recovered from shrub which was deresinated with approximately 32% and 33% resin miscella were identified as "GR-4A" and "GR-4B", respectively.

The samples were test compounded by the herein described procedure to determine the potential commercial utility of the experimental guayule rubber.

As shown in Table I, the rheometer data on "GR-4A" and "4B" approximated the values obtained on the Hevea control more closely than other guayule rubber samples.

Referring to Table II, the stocks containing "GR-4A" and "4-B" had slightly lower modulii values and higher elongation values than the Hevea vulcanizate. These data indicate the stocks were slightly under cured; the values could be adjusted by selecting the correct cure time.

TABLE IV
EFFECT OF RESIN MISCELLA CONCENTRATION ON ACETONE DERESINATION EFFICIENCY, 50° C.
Wt. % Resin Extracted and Miscella Concentration (Solids) After

| 15 min | 30 min | 45 min |
|---|---|---|
| 65 (1.9) | 69 (2.0) | 73 (2.1) |
| 92 (4.2) | 93 (4.3) | 96 (4.4) |
| 95 (5.6) | 95 (5.6) | 95 (5.6) |
| 96 (7.6) | 99 (7.8) | 99 (7.8) |
| 95 (10.4) | 97 (10.6) | 97 (10.6) |
| 101 (32.4) | 101 (32.4) | 100 (32.3) |
| 100 (33.0) | 100 (32.8) | — |

EXAMPLE 5
Deresination of Bagasse Recovered from Water Flotation; Whole and Defoliated Shrub In this example, bagasse was recovered from the water-flotation step and then deresinated to recover essentially all of the resin from either whole or defoliated shrub. It was determined that the bagasse obtained from the Saltillo process contains considerable resin. To illustrate the technical feasibility of recovering that resin, the bagasse was recovered from a simulated Saltillo process as well as the process as described in Example 1. The bagasse was pressed-dried and charged to a percolation column and acetone percolated to extract the contained guayule resin. High recovery yield of resin was realized in both experiments. An inherent advantage of this process is that the acetone extracting solvent effectively removes the adsorbed water from the shrub thereby providing a relatively dry bagasse suitable for fuel to supply the process energy requirements.

The resin recovered was similar to the resin recovered by deresinating whole shrub and would be suitable as a tackifier in rubber compounds and as a wood adhesive as well as other projected uses of guayule resin.

EXAMPLE 6

In this example the whole guayule shrub is deresinated to recover essentially all of the acetone-soluble resin. Water was then used to recover the water-soluble fraction and then guayule rubber recovered via water-flotation.

It has been unexpectedly discovered that a significant amount of the water-soluble fraction of guayule shrub can be relatively easily recovered by this process.

Experiments similar to those recorded in Example 2 were conducted with the variation that hot water was charged to the percolation column immediately after deresinating the guayule shrub with acetone. The hot water (approximately 50° C.) effectively displaced the acetone/resin miscella occluded on the column and by noting the color of the effluent from the column, it was possible to recover the occluded acetone/resin miscella. Charging of hot water to the column was continued and an aqueous solution of the water-soluble fraction was drained. In a series of experiments, the percentage of the water-soluble fraction recovered were 64%, 66%, 68% and 70%. If the aqueous solution of the water-soluble fraction was recycled, additional amounts of water-soluble sugars and polysaccharides would be obtained.

The aqueous solutions of the water-soluble fraction contained approximately 0.5–5% solids and could be used directly as an animal feed or fermented to produce alcohol. Alternatively, the aqueous solution can be concentrated by solar evaporation to a molasses-like syrup which in turn could be used for the aforementioned uses.

The water-extracted shrub was processed as in Example 1 to recover guayule rubber in good yield.

The guayule rubber was identified as "GR-6" and test compounded. Both the rheometer data and stress/strain results in Tables I and II, respectively, indicate that "GR-6" was essentially equivalent to the Hevea control and should be a valuable commercial rubber.

The data recorded under Example 6 indicate that the inventive process allows for the recovery of the resin, water-soluble and rubber fractions of guayule shrub.

EXAMPLE 7

According to this example, whole guayule shrub is extracted with water to recover a portion of the water-soluble fraction; this is followed by deresination with acetone and then recovery of light-colored rubber via water-flotation.

Guayule rubber recovered via the Saltillo process is dark gray, bordering on black in color. The dark color associated with guayule rubber recovered by the Saltillo process has no apparent adverse effect on its utility in formulations containing carbon black. Very good physical properties are realized. However, the dark gray color of the rubber detracts from its utility in formulations requiring a light-colored rubber.

It has unexpectedly been discovered that if the ground guayule shrub is extracted with water prior to deresination and the rubber recovered subsequently by water-flotation, a significantly lighter colored guayule rubber is recovered.

It is postulated that the initial water extract removes color bodies which, if left in the shrub are either occluded or otherwise incorporated into the rubber when the rubber particles are agglomerated to a mass to give the characteristic dark gray color. These color bodies are more easily removed prior to deresination. Although the guayule rubber recovered by this process is not colorless, the color is definitely lighter than the color of rubber obtained by the Saltillo process. It should also be noted that a portion of the water-soluble fraction is obtained while obtaining a lighter colored rubber in the process.

EXAMPLE 8

In this example, whole guayule shrub is extracted with a solvent for both resin and rubber; the rubber is then coagulated in a solvent for the resin, said solvent being a non-solvent for the rubber. It has been discovered that it is possible to extract both guayule resin and rubber simultaneously with a hydrocarbon solvent such as hexane. As indicated, conventional percolation via gravity of hexane through ground guayule shrub is slow unless the length/diameter ratio of the percolating column is lower than about five. Above a five length/diameter ratio column, percolation rate of the extracting solvent is considered uneconomically slow. As will be disclosed in subsequent examples, the percolation rate of a solvent for both guayule resin and rubber can be enhanced if the percolating bed is diluted with an inert material such as bagasse generated in the process or if the bed is presaturated with a nonsolvent for rubber such as acetone or water. Excellent extraction rates can be achieved if the percolation is conducted counter to gravity so that the actual flow of extracting solvent tends to prevent the bed from compacting and the force of gravity tends to retain the relatively dense shrub in the percolating column.

Extraction of both guayule resin and rubber simultaneously can advantageously be conducted by the procedure termed total immersion. The total immersion procedure consists of charging ground guayule shrub to an appropriate vessel containing a hydrocarbon solvent such as hexane. The resulting slurry can be agitated to effect a rapid dissolution of the resin and rubber. The miscella can then be drained and total recovery of resin and rubber ensured via washing the drained-shrub with additional hexane. The combined extracts can then be filtered to remove insoluble material and then added to a solvent such as acetone which is a good solvent for guayule resin but essentially a nonsolvent for guayule rubber to precipitate the contained rubber.

A glass column 5 cm in diameter to a height of 25 cm was charged with guayule shrub ground to a nominal 3 mm size. Approximately 3 liters of hexane were charged to the top of the column and allowed to percolate via gravity through the bed. The effluent was a relatively dark greenish-gray liquid which was recycled three times to effect additional extraction of resin and rubber. By recycling the miscella, fines from the bottom of the bed were effectively removed from the miscella via the filtering action of the bed. The bed was drained and then flushed with fresh hexane to recover occluded miscella.

The miscella and hexane flush were combined and filtered. At this point the hexane solution of guayule resin and rubber was diluted with acetone under conditions of good agitation. As would be obvious to those skilled in the art, the hexane/resin/rubber solution could have been concentrated by stripping hexane so that the amount of acetone required to completely coagulate the rubber would be minimal.

The coagulated rubber was easily freed of the acetone solution of resin by passing the slurry over a screen to retain the rubber. The rubber was relatively easily dried by removal of the volatile acetone. The rubber thus obtained was a light grayish green color and of good quality.

Another experiment was conducted in which the ground shrub was first percolated with hot water (about 50° C.) to remove a portion of the water-soluble fraction and to saturate the shrub with water. Upon charging of hexane to the water-saturated bed, the percolation rate of hexane was significantly higher than observed with an essentially dry percolation bed. The extract consisting of a hexane solution of guayule resin and rubber was diluted with acetone to coagulate the rubber. The guayule rubber recovered was of a lighter color, almost a light tan color in contrast to the grayish-green of the preceding example and dark gray characteristic of rubber prepared via the Saltillo process.

It should be noted that a significant advantage of the inventive process is that handling of the rather large amount of guayule shrub is minimized and that the four valuable components of guayule, namely, water-solubles, resin, rubber and bagasse are recovered in good yields.

This demonstrates the technical feasibility of using the inventive process in a total immersion embodiment using both dry shrub as well as water-saturated shrub.

EXAMPLE 9

This example is directed to the deresination of whole or defoliated shrub and extraction of rubber with hexane via total immersion of the acetone- or water-saturated shrub in hexane.

For example, one of the major drawbacks of extraction by total immersion of shrub in a specified solvent is that shrub fines are generated and tend to collect and prevent rapid filtration to recover the solvent/extract from the bagasse. The effect of shrub fines on the ease of filtering shrub/miscella slurries is particularly adverse if the miscella is viscous such as with very high viscosity hexane/rubber solutions.

It has unexpectedly been found that if guayule shrub is extracted with hot water prior to or subsequent to deresination with acetone, both processing steps being conducted via the total immersion procedure, a considerable amount of the fines which are generated either in the shrub grinding step or during the agitation used in the total immersion steps are removed with the water-soluble fraction extract as well as the resin extract. The presence of fines in the water extract or resin miscella has less of a detrimental effect on filtration because both the water and acetone extract solutions have relatively low viscosities and the fines can be relatively easily removed by filtration. By conducting a water extraction and resin extraction by total immersion prior to recovery of rubber by total immersion is hexane, a considerable amount of shrub-fines are removed prior to immersion in hexane thus allowing the hexane-immersion process to be conducted with minimum adverse effect(s) of fines. In addition, it has been determined that hexane-extraction of acetone-and, preferably, water-saturated shrub is an effective means for recovering guayule rubber. Preference is given to the hexane-extraction of water-saturated shrub since water per se will not coagulate a rubber-hexane solution. Therefore, the amount of water in the shrub can be varied over wide limits. It has been determined that a significant amount of water can be tolerated and, surprisingly, is advantageous. The specific advantage is that a minimum amount of hexane can be used to extract the rubber. The water present provides a vehicle which allows the hexane/shrub to be easily slurried. If no water was present, the amount of hexane added to the shrub would form at best a paste of very high viscosity which would require considerable energy to agitate. A further advantage of the process is that water tends to occlude the bagasse and the whole mass is heavier than the hexane/rubber solution. Thus by utilizing the correct portions of hexane/shrub/water, a relatively concentrated hexane solution of rubber will float on the surface of the water containing the majority of bagasse. The hexane/rubber solution can be relatively easily drawn off and filtered to remove relatively small amount of insoluble material and the rubber recovered by conventional means.

To demonstrate the utility of the process, whole shrub was deresinated with acetone and then with hot water (approximately 50° C.). After draining the bulk of the water, the water-saturated shrub was immersed in hexane and the slurry agitated to extract the rubber. The hexane/rubber solution floated on the surface and was drawn off, filtered and the rubber recovered by stripping hexane. The recovered guayule rubber was identified as "GR-9-A" in Table I.

In a similar experiment, the water-saturated shrub was ground in a Waring blender to simulate a disc-type pulping mill prior to immersion in hexane to extract the rubber. The rubber was recovered in a similar manner as the immediately preceeding example and identified as "GR-9-B".

Samples of "GR-9A" and "GR-9B" were mixed in the standard test recipe and evaluated in the Monsanto rheometer test.

As shown in Table I, sample "GR-9A" gave a CRI similar to that of the Hevea control whereas sample GR-9B had a significantly higher CRI. Without conducting additional experimentation, it cannot be stated the exact reason for the difference in CRI values. A possible reason is that because of the finer grind obtained in the Waring blender, a component of the guayule shrub which functions as a cure-rate promoter was extracted and produced the recorded result.

The stress/strain data summarized in Table II again indicate that the experimental guayule rubber compares favorably with the Hevea control.

EXAMPLE 10

This example sets forth several unique procedures for recovering rubber from deresinated whole or defoliated guayule shrub via percolation with hexane.

The difficulty of extracting guayule rubber via conventional percolation with a hydrocarbon solvent has already been mentioned. Upon further experimental investigation, it has been determined that dilution of freshly ground guayule shrub with spent bagasse will effect an increase in percolation rate. It has further been discovered that saturating guayule shrub with a nonsolvent for rubber such as acetone or water also significantly aids the hexane percolation rate. Because of economics, it is preferred to saturate the bed with water rather than acetone.

It has also been discovered after considerable experimental work that percolation with hexane counter to gravity is a very effective means of extracting guayule rubber.

Although the invention is not limited by theoretical considerations, it is believed that the enhanced rate of hexane percolation thru a bagasse-diluted percolation bed or thru a water-saturated bed is due to the avoidance of rubber concentration gradients caused by rapid extraction of rubber in an untreated percolation bed. The presence of bagase diluent allows for some mixing of solvent/miscella thus avoiding a very high concentration of rubber in hexane which because of its high viscosity will not flow rapidly. The presence of water slows the rate of dissolution of rubber and allows the miscella to percolate thru the bed before a high concentration of rubber is obtained. Upon recycling of the miscella, essentially all of the rubber can be extracted; however, under these conditions a very viscous high-concentration of rubber is avoided.

Counter-gravity hexane percolation to extract rubber is believed to be an efficient process even with non-treated percolation beds because the flow of extracting miscella tends to prevent the bed from compacting. If the percolation bed becomes sufficiently compacted the rubber/hexane solution must diffuse thru the bed resulting in a very slow percolation rate. In addition, the force of gravity tends to retain the relatively dense shrub in the percolated column.

The following specific data serve to illustrate the above concepts and demonstrate unexpected results.

A. Bagasse Diluted Percolation Bed

A 1:1 mixture was prepared of freshly ground, deresinated and dried guayule shrub with dried guayule bagasse. Bagasse is defined as shrub which has previously been exhaustingly deresinated and esentially all of the resin and rubber removed therefrom. The fines were removed from the bagasse via screening prior to diluting the freshly deresinated, dried guayule shrub with the bagasse.

The mixture was charged to a percolation column as previously described and hexane charged per our previously described procedure. Percolation of hexane thru the bagasse diluted bed was relatively rapid. Using the same bed height, it had been previously observed that hexane would not percolate thru the bed if non-diluted deresinated shrub wa used. Actual observation in the latter experiment was that the hexane penetrated only about the first few cm. of the bed over a period of several hours.

The hexane-solution of rubber recovered from the bagasse-diluted bed was filtered and sufficient amount of a paraphenylenediamine added to give 2.0 phr of the stabilizer. The stabilized rubber/hexane solution was then stripped of hexane in hot water, the rubber recovered was identified as "GR-10A" and evaluated in the test compound previously described. As shown by the data in Tables I and II, the cure rate and state of cure compared favorably with the Hevea control indicating that this experimental guayule rubber would be a commercially acceptable rubber.

B. Water-Saturated Percolated Bed

To demonstrate this procedure, 3.0 Kg of freshly ground guayule shrub was deresinated in the extractor previously described. After draining the resin miscella, hot water was charged to the column to remove a significant portion of the water-soluble fraction and then the column was allowed to drain. The shrub contained in the column at the time was considered water-saturated. Hexane was then percolated thru the column and after several recycles, the rubber miscella was removed and filtered. Hexane percolation rate was significanty faster than the control which would not percolate (see Example 10A). The rubber was stabilized with 2.0 phr of phenylenediamine type stabilizer and the rubber recovered via steam-stripping of hexane. The recovered dried rubber was identified as "GR-10B" and as indicated by the data recorded in Tables I and II had commercially acceptable properties when vulcanized using the referred to test formulation.

C. Counter-Gravity Hexane Percolation

The apparatus used to demonstrate counter-gravity hexane percolation to extract guayule rubber consisted of a glass column approximately 10 cm in diameter and one meter in height. A positive displacement pump was used to transfer hexane and (after counter-gravity percolation had been started) rubber/hexane miscella from a reservoir thru a heat exchanger to heat the miscella to approximately 40°-50° C. The effluent from the heat exchanger then flowed to the bottom of the glass column charged with guayule shrub. Retaining screens were placed in the glass column to support the shrub bed as well as to prevent large shrub particles to flow from the top of the glass column.

The hexane/rubber miscella flowed from the top of the column and thru a filter to remove fines. This in-line filter is considered optional and could be replaced with a centrifuge, or, not used at all. The miscella then flowed to the reservoir at which point the miscella could be recovered to isolate the contained rubber or optionally the miscella could be recycled to the bottom of the column.

Deresinated guayule shrub was mixed with 3 parts by weight of hexane/rubber miscella to 1 part by weight of shrub. The concentration of the hexane/rubber miscella was 9.19% rubber. The 9.19% rubber miscella was used to initiate the counter-gravity percolation to simulate relatively severe conditions of very high viscosity rubber miscella. Previously, it was demonstrated several times that initiating counter-gravity percolation with fresh hexane was a very effective procedure for extracting rubber.

The length/diameter ratio of the bed varied between 2.5 to 3.0. This ratio will vary during counter-gravity percolation because the flow of rubber miscella in a counter-gravity mode tends to expand the bed allowing for good percolation rates and extraction efficiencies.

Hexane/rubber miscella was then pumped counter-gravity thru the shrub bed and percolation continued for 45 minutes. Samples of the recycling rubber miscella were taken at specified times to determine the rate of rubber extraction. As shown by the data summarized in Table V under Run No. 1, extraction of rubber was rapid; about 90% of the rubber contained in the shrub was extracted after only 10 minutes. The column was drained and fresh hexane charged to recover the occluded rubber miscella on the column. By this technique the rubber recovered was 94%.

To further demonstrate that concentrated rubber/hexane miscella is effective in extracting guayule rubber from deresinated shrub, a similar experiment was conducted using an initial hexane-miscella containing 9.73% rubber. The extraction efficiencies for this experiment are also recorded in Table V under the heading of "Run No. 2".

Referring to Table V, Run No. 2; the rubber extraction efficiency after only ten minutes was 92%. After 10 minutes percolation, the rubber extraction efficiency was 93% indicative that the extraction of rubber is rapid and essentially complete after a short percolation time of about ten minutes.

The attainment of the high rubber extraction efficiencies summarized in Table V was unexpected based on prior art teachings. Prior art teaches that guayule shrub must be very finely ground or flacked to rupture all of the rubber cells in order to obtain high rubber extraction efficiencies. In the water-flotation process, the fine grinding is effected in a disc pulping mill, U.S. Pat. No. 4,136,131 teaches that guayule plants should be subjected to simultaneous compression and high shear forces under nonaqueous conditions prior to solvent extraction. Since conditions of high shear forces are known to reduce the molecular weight of natural rubber (both Hevea and guayule) the inventive process is superior to these prior art teachings.

TABLE V

| Counter-Gravity Hexane Percolation Extraction Efficiencies | | |
|---|---|---|
| Percolation Time, Minutes | % Rubber In Miscella | % Rubber Extracted |
| Run No. 1 | | |
| 0 | 9.19 | — |
| 10 | 9.28 | 90 |
| 20 | 9.41 | 91 |
| 30 | 9.48 | 92 |
| 45 | 9.52 | 92 |
| Run No. 2 | | |
| 0 | 9.73 | — |
| 10 | 9.89 | 92 |
| 20 | 9.80 | 92 |
| 30 | 9.95 | 93 |
| 45 | 9.97 | 93 |
| 60 | 9.97 | 93 |

Again to demonstrate utility, guayule rubber from whole shrub via counter-gravity hexane percolation was recovered. This sample was identified as "GR-10-C". Essentially the same procedure was used to recover rubber from defoliated shrub. This rubber sample was identified as "GR-10-C-1". Both experimental rubbers were mixed in the standard test recipe and tested.

The rheometer data in Table I indicate that samples "GR-10-C" and "GR-10-C-1" were similar to the other guayule rubbers and compared favorably with the Hevea control. Unfortunately the stress/strain data in Table II indicate that the vulcanizates containing "GR-10-C" and "GR-10-C-1" were over cured. A 600% modulus value could not be obtained because the test specimen broke at about a 500% elongation. Modification of the vulcanization time would result in properties similar to the other guayule samples and comparable to the Hevea control.

EXAMPLE 11

Counter-Gravity Hexane Percolation of Water-Saturated Shrub

This example demonstrates that the inventive procedures to enhance the rate of hexane-percolation of guayule shrub to extract rubber can be combined to advantage. A series of three columns were constructed and assembled and then charged with water-saturated deresinated guayule shrubs. The columns were interconnected in a manner which compelled the effluent from the top of the first column to pass through the second column from the bottom to the top (counter-gravity) and the effluent from the second column to pass to the third column in a similar counter-gravity flow.

The columns were arranged in such a manner that the first column was approximately 25 cm higher than the second column which in turn was approximately 25 cm higher than the third column. This arrangement ensured that a small positive hydraulic pressure of hexane was applied to the bottom inlet of each column. In addition, hexane was charged from a reservoir the level of which was also approximately 25 cm higher than the top of the first column which ensured a small hydraulic pressure of hexane on all three columns. It was determined experimentally that the passage of hexane thru the complete system was so rapid that it was difficult to add sufficient hexane to maintain a continuous flow. Under essentially the same experimental conditions using dried deresinated shrub, both the percolation of hexane and rate of rubber extraction was rapid. However, the rate of hexane percolation with the water-saturated shrub was significantly faster.

In addition to disclosing that the inventive procedure enhances hexane percolation to extract rubber from guayule shrub, this example also demonstrates that the disclosed advantages can be realized with varying degrees of water-saturated guayule shrub, that is, hexane percolation of guayule shrub of various moisture content can be effective.

EXAMPLE 12

This example demonstrates the discovery that a light-colored guayule rubber can be recovered via the following processing sequence; water-extraction, acetone-deresination and hexane-extraction of rubber. The same apparatus described in Example 10-C was used to demonstrate the recovery of a light-colored guayule rubber using counter-gravity hexane percolation to effect extraction of the rubber.

A 3.00 Kg charge of freshly hammermilled guayule shrub was charged to the percolation unit previously described. The ground shrub was extracted via percolation with hot water to recover the guayule water-soluble fraction. After draining the column, the water-extracted shrub was deresinated with acetone and the deresinated shrub stripped of acetone by slight heating under vacuum. The dried shrub was then charged to the counter-gravity percolation apparatus described in Example 10-C and extracted with hexane. The rubber/hexane miscella recovered was essentially transparent when viewed with transmitted light. In order to retain the very light color, the rubber contained in the rubber miscella was stabilized with 1.0 phr of 2,6-ditertbutyl-p-cresol which is a non-discoloring stabilizer. As a matter of convenience, hexane was evaporated from the miscella to recover a very light yellow-amber guayule rubber. Thin films of this rubber are essentially transparent and, when mixed in the previously described test recipe, and tested in the Monsanto rheometer gave results indicative of commercial utility. The stress/strain data confirmed that the light colored rubber can be vulcanized to a light-colored product having good physical properties. Although zinc oxide was used in the test recipe to promote the vulcanization reaction, the presence of conventional white pigments such as whiting or titania would ensure a white vulcanizate with good physical properties. In addition, other pigments of various colors could be used to prepare vulcanizates of selected vivid coloration.

It is to be understood that the term "resin miscella" is derived from the term "miscella" used in the soybean industry to describe the solvent extract of the soybean; in our case, the resin or rubber is the extract.

Thus, an acetone/resin miscella of at least about 4%, such as preferred as an oxygenated organic solvent in the present invention, is an acetone extract containing at least about 4% guayule resin. Similarly, a hydrocarbon solvent/guayule resin/guayule rubber miscella of at least about 4% comprises hydrocarbon solvent and at least 4% combined resin and rubber. As indicated above, the oxygenated solvent/resin miscella used in the present invention often contains up to about 40% resin and exhibits unusual solvent properties with respect to extracting resin. Thus, a typical resin miscella for use in this invention consists of an essentially anhydrous oxygenated organic solvent and about 4-40% resin.

The term "bagasse" describes the spent leaves and wood from the total extraction process; this is also known as spent pulp.

In the preceding examples, functionally equivalent organic and hydrocarbon solvents can be substituted with a minimum of routine experimentation and/or optimization; substantially the same results can be achieved.

For example, although acetone is our preferred oxygenated organic solvent, other solvents that can be utilized in lieu thereof include the lower molecular weight alcohols such as methanol, ethanol, n-propanol, isopropanol, n-butanol, 2-methylpropanol, the pentanols, hexanols, heptanols and octanols; anhydrous ketones such as 2-butanone, 3-methyl-2-butanone, 2-pentanone, 3-pentanone, the hexanones, heptanones and octanones. Low molecular weight ethers and esters should also be effective.

Although commercial grade hexane, which is a mixture of isomers, is the preferred hydrocarbon solvent, other such solvents that can be utilized in place of hexane include propane, butanes, pentanes, heptanes, octanes and nonanes and mixtures thereof. Cycloaliphatics such as cyclopentane, cyclohexane and cycloheptane can also be utilized. Aromatics such as benzene, toluene and the xylenes. Optimization can be achieved with a minimum of routine experimentation and mixtures of two or more of the above can often be used with good results.

The procedures set forth in examples 1 through 12 can be utilized to process, for example, whole guayule shrub or guayule shrub that has been defoliated.

EXAMPLE 13

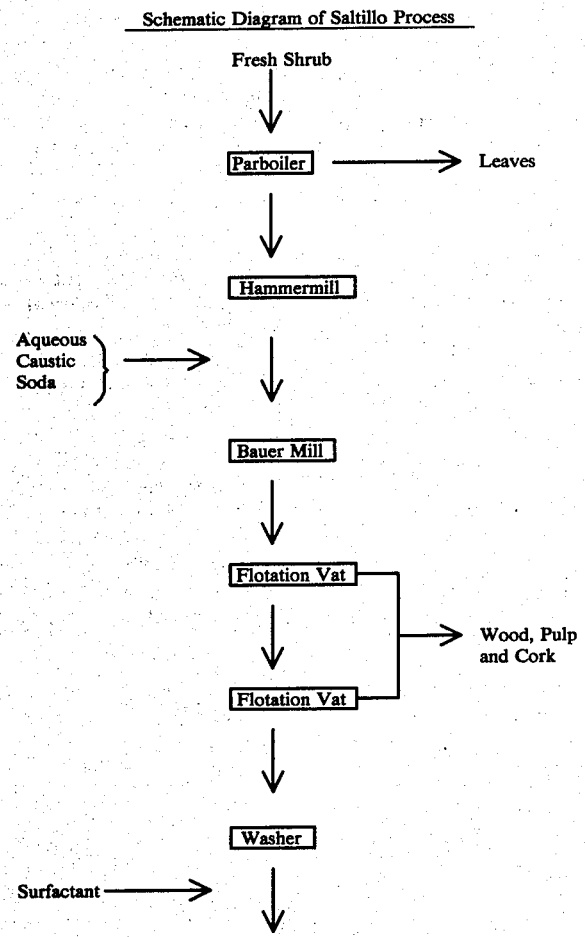

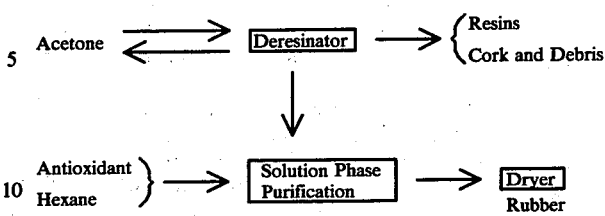

The Saltillo process for recovering rubber from guayule shrub, as heretofore described, is one wherein the entire shrub is initially parboiled to remove leaves. In the inventive process, the entire shrub can be processed and the leaves used to, for example, recover a greater quantity of bagasse and resin and aid percolation by diluting the ground shrub bed in the solvent extraction processes. The rubber recovered according to Example 12 procedure is improved as it is lighter in color than that recovered by the well known Saltillo process.

What is claimed is:

1. A process for isolating rubber, resins, water-solubles, and bagasse from comminuted guayule and guayule-like fibrous plant material which comprises the steps of:
   (a) drying the plant material to a moisture content of about 5 to about 25%; and then
   (b) deresinating with essentially anhydrous oxygenated organic solvent which is resin miscella comprising acetone and at least about 4% resin;
   (c) recovering rubber, water-solubles and by-product bagasse by water flotation.

2. A process as claimed in claim 1 wherein step (b) is carried out before step (c).

3. A process as claimed in claim 1 wherein the entire non-defoliated fibrous plant is processed.

4. A process as claimed in claim 1 wherein step (b) is carried out before step (c) and the entire non-defoliated fibrous plant is processed.

5. A process as claimed in claim 1 where step (c) is carried out with water at a temperature of at least about 60° C.

6. A process for isolating rubber, resins, water-solubles and bagasse from entire, non-defoliated, comminuted guayule and guayule-like fibrous plant material which comprises the steps of (a) drying the plant material to a moisture content of about 5 to about 25% and then (b) deresinating the dried material with the resin miscella of claim 1; and (c) recovering the rubber, water-solubles and by-product bagasse by water flotation, step (b) being carried out before step (c).

7. A process for isolating rubber, resins, water-solubles and bagasse from entire, non-defoliated, comminuted guayule and guayule-like fibrous plant material which comprises the steps of (a) drying the plant material to a moisture content of about 5 to about 25% and then (b) deresinating the dried material with the resin miscella of claim 1; and (c) recovering the rubber, water-solubles and by-product bagasse by water flotation, step (b) being carried out before step (c).

* * * * *